US010529989B2

(12) United States Patent
Kaneda et al.

(10) Patent No.: US 10,529,989 B2
(45) Date of Patent: Jan. 7, 2020

(54) BINDER COMPOSITION FOR SECONDARY BATTERY ELECTRODE, SLURRY COMPOSITION FOR SECONDARY BATTERY ELECTRODE, ELECTRODE FOR SECONDARY BATTERY, AND SECONDARY BATTERY

(71) Applicant: ZEON CORPORATION, Chiyoda-ku, Tokyo (JP)

(72) Inventors: Takuya Kaneda, Tokyo (JP); Kentaro Hayasaka, Tokyo (JP); Yusaku Matsuo, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 75 days.

(21) Appl. No.: 15/500,416

(22) PCT Filed: Jul. 23, 2015

(86) PCT No.: PCT/JP2015/003697
§ 371 (c)(1),
(2) Date: Jan. 30, 2017

(87) PCT Pub. No.: WO2016/024383
PCT Pub. Date: Feb. 18, 2016

(65) Prior Publication Data
US 2017/0214050 A1 Jul. 27, 2017

(30) Foreign Application Priority Data

Aug. 11, 2014 (JP) .................................. 2014-163744

(51) Int. Cl.
*H01M 4/62* (2006.01)
*C08L 9/06* (2006.01)
*C08L 33/06* (2006.01)
*H01M 10/0566* (2010.01)
*H01M 4/13* (2010.01)
*C08L 33/20* (2006.01)
*H01M 4/525* (2010.01)
*H01M 4/587* (2010.01)
*H01M 10/0525* (2010.01)
*H01M 4/02* (2006.01)

(52) U.S. Cl.
CPC ............. *H01M 4/622* (2013.01); *C08L 9/06* (2013.01); *C08L 33/06* (2013.01); *C08L 33/20* (2013.01); *H01M 4/13* (2013.01); *H01M 4/525* (2013.01); *H01M 4/587* (2013.01); *H01M 4/62* (2013.01); *H01M 10/0525* (2013.01); *H01M 10/0566* (2013.01); *H01M 2004/021* (2013.01)

(58) Field of Classification Search
CPC ..................................................... C08L 33/20
See application file for complete search history.

(56) References Cited

U.S. PATENT DOCUMENTS

| 2007/0264577 A1* | 11/2007 | Katayama | ............. | H01M 2/162 429/246 |
| 2012/0107690 A1* | 5/2012 | Wakizaka | ............... | H01M 4/13 429/217 |
| 2012/0177990 A1* | 7/2012 | Mitsuhashi | ........... | H01M 4/362 429/211 |
| 2014/0227432 A1* | 8/2014 | Liu | ....................... | H01M 4/133 427/58 |
| 2015/0303463 A1 | 10/2015 | Sasaki | | |
| 2016/0036055 A1 | 2/2016 | Yamamoto | | |

FOREIGN PATENT DOCUMENTS

| EP | 2680349 A1 | 1/2014 |
| EP | 2978051 A1 | 1/2016 |
| JP | 2010040228 A | 2/2010 |
| JP | 2012182012 A | 9/2012 |
| JP | 2012204303 A | 10/2012 |
| JP | 6197866 B2 | 9/2017 |
| WO | 2011002016 A1 | 1/2011 |
| WO | 2012049746 A1 | 4/2012 |
| WO | 2012115096 A1 | 8/2012 |
| WO | 2014073647 A1 | 5/2014 |
| WO | 2014148064 A1 | 9/2014 |

OTHER PUBLICATIONS

Feb. 14, 2017, International Preliminary Report on Patentability issued in the International Patent Application No. PCT/JP2015/003697.
Oct. 20, 2015, International Search Report issued in the International Patent Application No. PCT/JP2015/003697.
Dec. 11, 2017, Extended European Search Report issued by the European Patent Office in the corresponding European Patent Application No. 15832152.1.
Oct. 23, 2018, Communication pursuant to Article 94(3) EPC issued by the European Patent Office in the corresponding European Patent Application No. 15832152.1.

* cited by examiner

Primary Examiner — Jeremiah R Smith
(74) Attorney, Agent, or Firm — Kenja IP Law PC

(57) ABSTRACT

Provided is a binder composition for a secondary battery electrode that has excellent binding capacity and can cause a secondary battery to display excellent rate characteristics and cycle characteristics. The binder composition for a secondary battery electrode contains: a first particulate polymer having a degree of swelling in electrolysis solution of at least 400 mass % and no greater than 900 mass % and a glass transition temperature of at least −60° C. and no higher than −15° C.; a second particulate polymer having a degree of swelling in electrolysis solution of greater than 100 mass % and no greater than 200 mass % and a glass transition temperature of at least −10° C. and no higher than 30° C.; and water.

8 Claims, No Drawings

BINDER COMPOSITION FOR SECONDARY BATTERY ELECTRODE, SLURRY COMPOSITION FOR SECONDARY BATTERY ELECTRODE, ELECTRODE FOR SECONDARY BATTERY, AND SECONDARY BATTERY

TECHNICAL FIELD

The present disclosure relates to a binder composition for a secondary battery electrode, a slurry composition for a secondary battery electrode, an electrode for a secondary battery, and a secondary battery.

BACKGROUND

Secondary batteries such as lithium ion secondary batteries have characteristics such as compact size, light weight, high energy-density, and the ability to be repeatedly charged and discharged, and are used in a wide range of applications. Therefore, studies have been carried out in recent years with the objective of further raising the performance of secondary batteries through improvement of electrodes and other battery components.

An electrode for a secondary battery, such as a lithium ion secondary battery, normally includes a current collector and an electrode mixed material layer formed on the current collector. The electrode mixed material layer is formed, for example, by applying a slurry composition onto the current collector and then drying the slurry composition. The slurry composition contains a dispersion medium and, dispersed therein, an electrode active material, a binder composition containing a binder, and so forth.

In order to further improve the performance of secondary batteries, attempts have been made in recent years to further improve binder compositions used in electrode mixed material layer formation. In one specific example, it has been proposed that that binding capacity of an electrode active material to itself or between an electrode active material and a current collector can be increased and performance of a secondary battery can be improved by using a binder composition that contains two types of particulate polymers as a binder.

More specifically, PTL 1, for example, proposes a technique for increasing binding capacity of an electrode active material to itself or between an electrode active material and a current collector while also improving cycle characteristics of a secondary battery by using, as a binder, first rubbery resin particles composed of styrene-butadiene rubber particles having an average particle diameter of at least 130 nm and second rubbery resin particles composed of nitrile rubber particles having an average particle diameter of less than 130 nm.

Moreover, PTL 2, for example, proposes a technique for increasing binding capacity between an electrode active material and a current collector while also improving pressing processability of an electrode for a secondary battery by using, as a binder, (a) a polymer latex having a number average particle diameter of from 80 nm to 120 nm, a glass transition temperature of from 5° C. to 50° C., and a toluene gel content of at least 70% and (b) a polymer latex having a number average particle diameter of from 150 nm to 280 nm, a glass transition temperature of from −50° C. to 0° C., and a toluene gel content of at least 70%.

CITATION LIST

Patent Literature

PTL 1: JP 2012-182012 A
PTL 2: JP 2010-40228 A

SUMMARY

Technical Problem

However, with respect to binder compositions in which conventional binders such as described above are used, there is room for improvement in terms of further increasing binding capacity and also further improving electrical characteristics, such as rate characteristics and cycle characteristics, of secondary batteries that are produced using these binder compositions.

Accordingly, one objective of the present disclosure is to provide a binder composition for a secondary battery electrode that has excellent binding capacity and can cause a secondary battery to display excellent rate characteristics and cycle characteristics.

Another objective of the present disclosure is to provide a slurry composition for a secondary battery electrode capable of forming an electrode mixed material layer that has excellent binding capacity with a current collector and can cause a secondary battery to display excellent rate characteristics and cycle characteristics.

Another objective of the present disclosure is to provide an electrode for a secondary battery that has high peel strength and can cause a secondary battery to display excellent rate characteristics and cycle characteristics.

Another objective of the present disclosure is to provide a secondary battery having excellent rate characteristics and cycle characteristics.

Solution to Problem

The inventors conducted diligent investigation with the aim of solving the problems described above. As a result, the inventors discovered that a binder composition containing, as a binder, a first particulate polymer having a degree of swelling in electrolysis solution and a glass transition temperature within specific ranges and a second particulate polymer having a degree of swelling in electrolysis solution and a glass transition temperature within specific ranges, differing from those for the first particulate polymer, has excellent binding capacity and can cause a secondary battery to display excellent rate characteristics and cycle characteristics. This discovery led to the present disclosure.

Specifically, the present disclosure aims to advantageously solve the problems described above by disclosing a binder composition for a secondary battery electrode comprising: a first particulate polymer having a degree of swelling in electrolysis solution of at least 400 mass % and no greater than 900 mass % and a glass transition temperature of at least −60° C. and no higher than −15° C.; a second particulate polymer having a degree of swelling in electrolysis solution of greater than 100 mass % and no greater than 200 mass % and a glass transition temperature of at least −10° C. and no higher than 30° C.; and water. Through combined use of the first particulate polymer and the second particulate polymer having degrees of swelling in electrolysis solution and glass transition temperatures that are within these specific ranges, a binder composition having excellent binding capacity can be obtained and a secondary battery produced using this binder composition can be caused to display excellent rate characteristics and cycle characteristics.

The "degree of swelling in electrolysis solution" and "glass transition temperature" of a particulate polymer referred to in the present disclosure can be measured by methods described in the EXAMPLES section of the present specification.

In the presently disclosed binder composition for a secondary battery electrode, it is preferable that, in terms of solid content, the first particulate polymer is contained in an amount of at least 30 parts by mass and no greater than 95 parts by mass per 100 parts by mass, in total, of the first particulate polymer and the second particulate polymer. As a result of the proportion constituted by the first particulate polymer being within the aforementioned range, secondary battery rate characteristics and cycle characteristics can both be achieved to high levels.

In the presently disclosed binder composition for a secondary battery electrode, the first particulate polymer preferably includes at least 50 mass % and no greater than 99.5 mass % of a (meth)acrylic acid ester monomer unit. As a result of the (meth)acrylic acid ester monomer unit being included in the first particulate polymer in the aforementioned proportion, secondary battery rate characteristics can be further improved.

In the present disclosure, "(meth)acryl" is used to indicate "acryl" and/or "methacryl".

In the presently disclosed binder composition for a secondary battery electrode, the second particulate polymer preferably includes at least 5 mass % and no greater than 70 mass % of a conjugated diene monomer unit and at least 10 mass % and no greater than 90 mass % of an aromatic vinyl monomer unit. As a result of the conjugated diene monomer unit and the aromatic vinyl monomer unit being included in the second particulate polymer in the aforementioned proportions, secondary battery cycle characteristics can be further improved.

In the presently disclosed binder composition for a secondary battery electrode, a number average particle diameter of the first particulate polymer is preferably equal to a number average particle diameter of the second particulate polymer multiplied by a factor of at least 1 and no greater than 5. As a result of the ratio of the number average particle diameters of the first particulate polymer and the second particulate polymer being within the aforementioned range, secondary battery rate characteristics and cycle characteristics can both be achieved to high levels.

The "number average particle diameter" of a particulate polymer referred to in the present disclosure can be measured by a method described in the EXAMPLES section of the present specification.

Moreover, the present disclosure aims to advantageously solve the problems described above by disclosing a slurry composition for a secondary battery electrode comprising: any one of the binder compositions for a secondary battery electrode described above; and an electrode active material. Through use of the binder composition containing the first particulate polymer and the second particulate polymer in this manner, it is possible to obtain a slurry composition for a secondary battery electrode capable of forming an electrode mixed material layer that has excellent binding capacity with a current collector and can cause a secondary battery to display excellent rate characteristics and cycle characteristics.

Furthermore, the present disclosure aims to advantageously solve the problems described above by disclosing an electrode for a secondary battery comprising an electrode mixed material layer obtainable using the slurry composition for a secondary battery electrode described above. By using the slurry composition described above to form an electrode mixed material layer in this manner, an electrode having excellent peel strength can be obtained and a secondary battery in which this electrode is used can be caused to display excellent rate characteristics and cycle characteristics.

In the presently disclosed electrode for a secondary battery, the electrode mixed material layer preferably has a porosity of at least 10.7% and no greater than 24.1%. As a result of the porosity of the electrode mixed material layer being within the aforementioned range, a high-density electrode mixed material layer can be obtained while also causing a secondary battery to display excellent rate characteristics and cycle characteristics.

In the present disclosure, "porosity" refers to the difference between the true density and the bulk density of an electrode mixed material layer, expressed as a percentage relative to the true density of the electrode mixed material layer. The porosity can, for example, be calculated using the following formula.

Porosity (%)=[1−{(Mass per unit area of electrode mixed material layer/Thickness of electrode mixed material layer)/True density of electrode mixed material layer}]×100

Moreover, the present disclosure aims to advantageously solve the problems described above by disclosing a secondary battery comprising a positive electrode, a negative electrode, a separator, and an electrolysis solution, wherein either or both of the positive electrode and the negative electrode are any one of the electrodes for a secondary battery described above. As a result of any of the electrodes described above being used as a positive electrode and/or a negative electrode in this manner, a secondary battery having excellent rate characteristics and cycle characteristics can be obtained.

Advantageous Effect

According to the present disclosure, it is possible to provide a binder composition for a secondary battery electrode that has excellent binding capacity and can cause a secondary battery to display excellent rate characteristics and cycle characteristics.

Moreover, according to the present disclosure, it is possible to provide a slurry composition for a secondary battery electrode capable of forming an electrode mixed material layer that has excellent binding capacity with a current collector and can cause a secondary battery to display excellent rate characteristics and cycle characteristics.

Furthermore, according to the present disclosure, it is possible to provide an electrode for a secondary battery that has high peel strength and can cause a secondary battery to display excellent rate characteristics and cycle characteristics.

Also, according to the present disclosure, it is possible to provide a secondary battery that has excellent rate characteristics and cycle characteristics.

DETAILED DESCRIPTION

The following provides a detailed description of an embodiment of the present disclosure.

A presently disclosed binder composition for a secondary battery electrode can be used in production of a slurry composition for a secondary battery electrode. Moreover, a slurry composition for a secondary battery electrode produced using the presently disclosed binder composition for a secondary battery electrode can be used in formation of an electrode for a secondary battery. Furthermore, a presently disclosed secondary battery includes the presently disclosed electrode for a secondary battery.

(Binder Composition for Secondary Battery Electrode)

The presently disclosed binder composition for a secondary battery electrode is an aqueous binder composition that has an aqueous medium as a dispersion medium and that contains a particulate binder and water, and may optionally further contain other components that are normally used in the field of secondary batteries. A feature of the presently disclosed binder composition for a secondary battery electrode is that the binder composition for a secondary battery electrode contains a combination of particulate polymers described below in (I) and (II) as the particulate binder.

(I) A first particulate polymer having a degree of swelling in electrolysis solution of at least 400 mass % and no greater than 900 mass % and a glass transition temperature of at least −60° C. and no higher than −15° C.

(II) A second particulate polymer having a degree of swelling in electrolysis solution of greater than 100 mass % and no greater than 200 mass % and a glass transition temperature of at least −10° C. and no higher than 30° C.

<Binder>

In an electrode for a secondary battery that is produced by forming an electrode mixed material layer on a current collector using a slurry composition for a secondary battery electrode containing the presently disclosed binder composition and an electrode active material, the binder is a component that holds together components contained in the electrode mixed material layer so that these components do not become detached from the electrode mixed material layer. In general, when a particulate binder in an electrode mixed material layer is immersed in an electrolysis solution, the binder absorbs the electrolysis solution and swells while maintaining its particulate form, and thereby causes binding of an electrode active material to itself or between the electrode active material and a current collector such as to prevent the electrode active material from becoming detached from the current collector. The binder also fulfills a function of binding particles other than the electrode active material that are contained in the electrode mixed material layer in order to maintain strength of the electrode mixed material layer.

A feature of the presently disclosed binder composition is that the first particulate polymer and the second particulate polymer described above are used in combination as the particulate binder in order to cause favorable binding of an electrode active material to itself in an electrode mixed material layer formed using the binder composition or between the electrode active material and a current collector, and also in order to cause a secondary battery to display excellent electrical characteristics. It should be noted that the presently disclosed binder composition may further contain a particulate polymer other than the first particulate polymer and the second particulate polymer as the particulate binder.

Although it has not yet been clarified why binding capacity and secondary battery electrical characteristics can be improved through combined use, as the binder, of the first particulate polymer and the second particulate polymer having the specific degrees of swelling in electrolysis solution and glass transition temperatures described above, the reason for this improvement it presumed to be as follows.

Specifically, the first particulate polymer having a glass transition temperature of at least a specific value and the second particulate polymer having a glass transition temperature within a specific range have excellent toughness and display good binding capacity in an electrode mixed material layer. Accordingly, binding capacity can be improved through combined used of the first particulate polymer and the second particulate polymer.

In a situation in which an electrode mixed material layer is formed using a binder composition that contains a particulate polymer, there is a concern that ion conductivity may be impaired and secondary battery rate characteristics may be lowered as a result of the particulate polymer becoming unevenly distributed toward the surface of the electrode mixed material layer due to migration or the like. However, ion conductivity can be ensured and a secondary battery can be caused to display good rate characteristics by using the first particulate polymer having a degree of swelling in electrolysis solution that is at least a specific value while also setting the degree of swelling in electrolysis solution of the second particulate polymer as at least a specific value.

An electrode mixed material layer formed on a current collector may be subjected to a pressing process in production of an electrode for a secondary battery and, particularly in the case of an electrode in which the density of the electrode mixed material layer is increased, deformation of an electrode active material tends occur during the pressing process, leading to lower rate characteristics. However, deformation of an electrode active material during a pressing process can be inhibited and lowering of rate characteristics can be inhibited, even when the density of the electrode mixed material layer is increased, by using the first particulate polymer having a glass transition temperature of no greater than a specific value while also setting the glass transition temperature of the second particulate polymer as no greater than a specific value.

In a situation in which a polymer having a high degree of swelling and a low glass transition temperature like the first particulate polymer is used in order to improve rate characteristics, this may lead to lower secondary battery cycle characteristics because it is not possible to sufficiently suppress expansion and contraction of an electrode active material associated with repeated charging and discharging. However, expansion and contraction of an electrode active material can be sufficiently constrained and a secondary battery can be caused to display good cycle characteristics through combined use of the second particulate polymer, which has a degree of swelling in electrolysis solution of no greater than a specific value and a relatively high glass transition temperature, while also setting the degree of swelling in electrolysis solution of the first particulate polymer as no greater than a specific value.

[First Particulate Polymer]

As explained above, the first particulate polymer is required to have a degree of swelling in electrolysis solution of at least 400 mass % and no greater than 900 mass % and a glass transition temperature of at least −60° C. and no higher than −15° C. When the presently disclosed binder composition is used to form an electrode mixed material layer, the main functions of the first particulate polymer are to ensure ion conductivity in the electrode mixed material layer and reduce the resistance of the electrode mixed material layer, and also to inhibit deformation of an electrode active material during a pressing process.

—Degree of Swelling in Electrolysis Solution—

The degree of swelling in electrolysis solution of the first particulate polymer is required to be at least 400 mass % and no greater than 900 mass %, is preferably at least 500 mass % and more preferably at least 600 mass %, and is preferably no greater than 800 mass % and more preferably no greater than 700 mass %. If the degree of swelling in electrolysis solution of the first particulate polymer is less than 400 mass %, the resistance of an electrode mixed material layer cannot be sufficiently reduced and, as a result, a secondary battery produced using the binder composition suffers from lower rate characteristics. On the other hand, if the degree of swelling in electrolysis solution of the first particulate polymer is greater than 900 mass %, expansion and contraction of an electrode active material cannot be suppressed even when the first particulate polymer is used in combination with the second particulate polymer, described in detail further below, which results in lower secondary battery cycle characteristics.

—Glass Transition Temperature—

The glass transition temperature of the first particulate polymer is required to be at least −60° C. and no higher than −15° C., is preferably at least −55° C. and more preferably at least −50° C., and is preferably no higher than −25° C. and more preferably no higher than −30° C. If the glass transition temperature of the first particulate polymer is lower than −60° C., binding capacity cannot be sufficiently improved and, as a result, an electrode including an electrode mixed material layer formed using the binder composition suffers from reduced peel strength. On the other hand, if the glass transition temperature of the first particulate polymer is higher than −15° C., deformation of an electrode active material during a pressing process cannot be sufficiently inhibited, which results in lower secondary battery rate characteristics.

The degree of swelling in electrolysis solution and the glass transition temperature of the first particulate polymer can be adjusted without any specific limitations by altering, for example, the type and amount of each monomer used to form the first particulate polymer, and the molecular weight and crosslink density of the first particulate polymer.

—Number Average Particle Diameter—

The number average particle diameter of the first particulate polymer is preferably at least 100 nm, more preferably at least 150 nm, and even more preferably at least 200 nm, and is preferably no greater than 1,000 nm, more preferably no greater than 800 nm, and even more preferably no greater than 600 nm. As a result of the number average particle diameter being within any of the aforementioned ranges, expansion and contraction of an electrode active material can be favorably suppressed and resistance of an electrode mixed material layer can be favorably reduced.

—Polymer Composition—

A polymer constituting the first particulate polymer may be any polymer that has the properties described above and that is present in a particulate state in an aqueous medium used as a dispersion medium. Specifically, the polymer constituting the first particulate polymer may for example be, but is not specifically limited to, a copolymer (A) including a (meth)acrylic acid ester monomer unit. The following describes the copolymer (A) including the (meth)acrylic acid ester monomer unit as one example of the polymer constituting the first particulate polymer.

The phrase "including a monomer unit" is used in the present specification with the meaning that "a polymer obtained with the monomer includes a structural unit derived from the monomer".

Examples of (meth)acrylic acid ester monomers that can be used to form the (meth)acrylic acid ester monomer unit of the copolymer (A) include, but are not specifically limited to, alkyl acrylates such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid ester monomers, alkyl acrylates are preferable, ethyl acrylate, n-butyl acrylate, and 2-ethylhexyl acrylate are more preferable, and n-butyl acrylate is even more preferable.

One of such (meth)acrylic acid ester monomers may be used individually, or two or more of such (meth)acrylic acid ester monomers may be used in combination in a freely selected ratio.

The proportion constituted by the (meth)acrylic acid ester monomer unit in the copolymer (A) is preferably at least 50 mass %, more preferably at least 70 mass %, and even more preferably at least 90 mass %, and is preferably no greater than 99.5 mass %, more preferably no greater than 99 mass %, and even more preferably no greater than 98 mass %. As a result of the proportion constituted by the (meth)acrylic acid ester monomer unit in the first particulate polymer being within any of the aforementioned ranges, a secondary battery can be caused to display excellent rate characteristics.

In addition to the (meth)acrylic acid ester monomer unit described above, the copolymer (A) may optionally include an ethylenically unsaturated carboxylic acid monomer unit, a vinyl cyanide monomer unit, a crosslinkable monomer unit, and other optional monomer units.

Examples of ethylenically unsaturated carboxylic acid monomers that can be used to form the ethylenically unsaturated carboxylic acid monomer unit of the copolymer (A) include, but are not specifically limited to, monocarboxylic acids and dicarboxylic acids such as acrylic acid, methacrylic acid, crotonic acid, maleic acid, fumaric acid, and itaconic acid, and anhydrides of these carboxylic acids. Of these ethylenically unsaturated carboxylic acid monomers, ethylenically unsaturated monocarboxylic acid monomers are preferable, and acrylic acid and methacrylic acid are more preferable.

One ethylenically unsaturated carboxylic acid monomer may be used individually, or two or more ethylenically unsaturated carboxylic acid monomers may be used in combination in a freely selected ratio.

The proportion constituted by the ethylenically unsaturated carboxylic acid monomer unit in the copolymer (A) is preferably at least 0.1 mass %, more preferably at least 0.2 mass %, and even more preferably at least 0.3 mass %, and is preferably no greater than 10 mass %, more preferably no greater than 8 mass %, and even more preferably no greater than 5 mass %.

Examples of vinyl cyanide monomers that can be used to form the vinyl cyanide monomer unit of the copolymer (A) include, but are not specifically limited to, acrylonitrile, methacrylonitrile, α-chloroacrylonitrile, and α-ethylacrylonitrile. Of these vinyl cyanide monomers, acrylonitrile is preferable.

One vinyl cyanide monomer may be used individually, or two or more vinyl cyanide monomers may be used in combination in a freely selected ratio.

The proportion constituted by the vinyl cyanide monomer unit in the copolymer (A) is preferably at least 0.1 mass %, more preferably at least 0.2 mass %, and even more preferably at least 1 mass %, and is preferably no greater than 10 mass %, more preferably no greater than 5 mass %, and even more preferably no greater than 3 mass %.

Crosslinkable monomers that can be used to form the crosslinkable monomer unit of the copolymer (A) are typically monomers that are thermally crosslinkable. More specific examples of crosslinkable monomers that can be used include monofunctional monomers having a thermally crosslinkable group and one olefinic double bond per molecule, and multifunctional monomers having two or more olefinic double bonds per molecule.

Examples of the thermally crosslinkable groups include an epoxy group, an N-methylol amide group, an oxetanyl group, an oxazoline group, and combinations thereof. Of these thermally crosslinkable groups, an epoxy group is preferable in terms of ease with which crosslinking and crosslink density can be adjusted.

Examples of crosslinkable monomers having an epoxy group as a thermally crosslinkable group and having an olefinic double bond include unsaturated glycidyl ethers such as vinyl glycidyl ether, allyl glycidyl ether, butenyl glycidyl ether, and o-allyl phenyl glycidyl ether; monoepoxides of dienes and polyenes such as butadiene monoepoxide, chloroprene monoepoxide, 4,5-epoxy-2-pentene, 3,4-epoxy-1-vinyl cyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of crosslinkable monomers having an N-methylol amide group as a thermally crosslinkable group and having an olefinic double bond include (meth)acrylamides having a methylol group such as N-methylol(meth)acrylamide.

In the present specification, "(meth)acrylamide" is used to indicate "acrylamide" and/or "methacrylamide".

Examples of crosslinkable monomers having an oxetanyl group as a thermally crosslinkable group and having an olefinic double bond include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

In the present specification, "(meth)acryloyl" is used to indicate "acryloyl" and/or "methacryloyl".

Examples of crosslinkable monomers having an oxazoline group as a thermally crosslinkable group and having an olefinic double bond include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of multifunctional monomers having two or more olefinic double bonds include allyl (meth)acrylate, ethylene di(meth)acrylate, diethylene glycol di(meth)acrylate, triethylene glycol di(meth)acrylate, tetraethylene glycol di(meth)acrylate, trimethylolpropane-tri(meth)acrylate, dipropylene glycol diallyl ether, polyglycol diallyl ether, triethylene glycol divinyl ether, hydroquinone diallyl ether, tetraallyloxyethane, trimethylolpropane-diallyl ether, allyl and vinyl ethers of multifunctional alcohols other than those listed above, triallylamine, methylene bisacrylamide, and divinyl benzene.

In the present specification, "(meth)acrylate" is used to indicate "acrylate" and/or "methacrylate".

Of these examples, allyl methacrylate and N-methylolacrylamide are more preferable as a crosslinkable monomer.

One crosslinkable monomer may be used individually, or two or more crosslinkable monomers may be used in combination in a freely selected ratio.

The proportion constituted by the crosslinkable monomer unit in the copolymer (A) is preferably no greater than 3 mass %, more preferably no greater than 2 mass %, and even more preferably no greater than 0.5 mass %. Moreover, it is particularly preferable that the copolymer (A) does not include a crosslinkable monomer unit.

Examples of other optional monomer units include monomer units obtained through polymerization of the optional monomers listed below. One of such optional monomers may be used individually, or two or more of such optional monomers may be used in combination in a freely selected ratio.

Examples of optional monomers that can be used include styrene-based monomers such as styrene, chlorostyrene, vinyltoluene, t-butylstyrene, methyl vinylbenzoate, vinylnaphthalene, chloromethylstyrene, hydroxymethylstyrene, and α-methylstyrene; unsaturated carboxylic acid amide monomers such as acrylamide and methacrylamide; sulfonate group-containing monomers such as vinyl sulfonic acid, styrene sulfonic acid, allyl sulfonic acid, sulfoethyl methacrylate, sulfopropyl methacrylate, and sulfobutyl methacrylate, and alkali metal salts thereof; and fluorine-containing (meth)acrylic acid ester monomers.

The proportion constituted by such optional monomer units in the copolymer (A) is preferably from 0 mass % to 30 mass %, and more preferably from 0 mass % to 25 mass %.

The first particulate polymer constituted by the copolymer (A) described above can be produced, for example, through polymerization, in an aqueous solvent, of a monomer composition containing the monomers described above. The proportion constituted by each monomer in the monomer composition is normally the same as the proportion constituted by the corresponding repeating unit in the target polymer.

No specific limitations are placed on the mode of polymerization and a method such as solution polymerization, suspension polymerization, bulk polymerization, or emulsion polymerization can be used. Examples of types of polymerization reactions that can be used include ionic polymerization, radical polymerization, and living radical polymerization. Of these polymerization reactions, emulsion polymerization is particularly preferable from the perspective of production efficiency because a high molecular weight is easily achieved, and because re-dispersion treatment is unnecessary since the resultant polymer is already dispersed in water, which allows the polymer to be used, as produced, in the production of the binder composition. The emulsion polymerization can be carried out by a standard method.

The polymerization may be carried out with a commonly used emulsifier, dispersant, polymerization initiator, polymerization aid, chain transfer agent, or the like, and the amount thereof may also be the same as commonly used. In the polymerization, seed particles may be used to perform seed polymerization. The polymerization conditions may also be selected freely in accordance with the polymerization method, type of polymerization initiator, and the like.

The pH of an aqueous dispersion of polymer particles that is obtained through the polymerization method described above may be adjusted to within a range of normally 5-10, and preferably 5-9, using a basic aqueous solution containing a hydroxide of an alkali metal (for example, Li, Na, K, Rb, or Cs), ammonia, an inorganic ammonium compound (for example, $NH_4Cl$), an organic amine compound (for example, ethanolamine or diethylamine), or the like.

[Second Particulate Polymer]

The second particulate polymer is required to have a degree of swelling in electrolysis solution of greater than 100 mass % and no greater than 200 mass % and a glass transition temperature of at least $-10°$ C. and no higher than $30°$ C. When the presently disclosed binder composition is used to form an electrode mixed material layer, the main functions of the second particulate polymer are to display good binding capacity and to sufficiently constrain expansion and contraction of an electrode active material so as to suppress electrode expansion.

—Degree of Swelling in Electrolysis Solution—

The degree of swelling in electrolysis solution of the second particulate polymer is required to be greater than 100 mass % and no greater than 200 mass %, is preferably at least 120 mass % and more preferably at least 140 mass %, and is preferably no greater than 180 mass % and more preferably no greater than 160 mass %. As a result of the degree of swelling in electrolysis solution of the second particulate polymer being greater than 100 mass %, reduction of ion conductivity and lowering of secondary battery rate characteristics can be inhibited. However, if the degree of swelling in electrolysis solution of the second particulate polymer is greater than 200 mass %, an electrode active material cannot be sufficiently constrained, which results in lower secondary battery cycle characteristics.

—Glass Transition Temperature—

The glass transition temperature of the second particulate polymer is required to be at least $-10°$ C. and no higher than $30°$ C., is preferably at least $-5°$ C. and more preferably at least $0°$ C., and is preferably no higher than $20°$ C. and more preferably no higher than $15°$ C. If the glass transition temperature of the second particulate polymer is lower than $-10°$ C. or higher than $30°$ C., binding capacity cannot be sufficiently improved and, as a result, the peel strength of an electrode including an electrode mixed material layer formed using the binder composition is reduced. Moreover, if the glass transition temperature of the second particulate polymer is higher than $30°$ C., deformation of an electrode active material during a pressing process cannot be sufficiently inhibited even when the second particulate polymer is used in combination with the first particulate polymer, which results in lower secondary battery rate characteristics.

The degree of swelling in electrolysis solution and the glass transition temperature of the second particulate polymer can be adjusted without any specific limitations by altering, for example, the type and amount of each monomer used to form the second particulate polymer, and the molecular weight and crosslink density of the second particulate polymer.

—Number Average Particle Diameter—

The number average particle diameter of the second particulate polymer is preferably at least 100 nm and no greater than 200 nm. As a result of the number average particle diameter being within the aforementioned range, suppression of expansion and contraction of an electrode active material and reduction of resistance of an electrode mixed material layer can both be favorably achieved.

With respect to the number average particle diameters of the first particulate polymer and the second particulate polymer described above, the number average particle diameter of the first particulate polymer is preferably equal to the number average particle diameter of the second particulate polymer multiplied by a factor of at least 1, more preferably by a factor of at least 1.5, and even more preferably by a factor of at least 2, and preferably by a factor of no greater than 5, more preferably by a factor of no greater than 4, and even more preferably by a factor of no greater than 3. As a result of the particle diameter ratio of the number average particle diameters of the first particulate polymer and the second particulate polymer (first particulate polymer/second particulate polymer) being within any of the aforementioned ranges, the first particulate polymer and the second particulate polymer can each be caused to favorably display their intended functions, and secondary battery rate characteristics and cycle characteristics can both be achieved to high levels.

—Polymer Composition—

A polymer constituting the second particulate polymer may be any polymer that has the properties described above and that is present in a particulate state in an aqueous medium used as a dispersion medium. Specifically, the polymer constituting the second particulate polymer may for example be, but is not specifically limited to, a copolymer (B) including a conjugated diene monomer unit and an aromatic vinyl monomer unit. The following describes the copolymer (B) including the conjugated diene monomer unit and the aromatic vinyl monomer unit as one example of the polymer constituting the second particulate polymer.

Examples of conjugated diene monomers that can be used to form the conjugated diene monomer unit of the copolymer (B) include, but are not specifically limited to, aliphatic conjugated diene monomers such as 1,3-butadiene, 2-methyl-1,3-butadiene, 2,3-dim ethyl-1,3-butadiene, 2-chloro-1,3-butadiene, substituted linear conjugated pentadienes, and substituted and side chain conjugated hexadienes. Of these conjugated diene monomers, 1,3-butadiene is preferable.

One conjugated diene monomer may be used individually, or two or more conjugated diene monomers may be used in combination in a freely selected ratio.

The proportion constituted by the conjugated diene monomer unit in the copolymer (B) is preferably at least 5 mass %, more preferably at least 15 mass %, even more preferably at least 20 mass %, and particularly preferably at least 30 mass %, and is preferably no greater than 70 mass %, more preferably no greater than 55 mass %, and even more preferably no greater than 40 mass %. As a result of the proportion constituted by the conjugated diene monomer unit in the second particulate polymer being within any of the aforementioned ranges, a secondary battery can be caused to display excellent cycle characteristics.

Examples of aromatic vinyl monomers that can be used to form the aromatic vinyl monomer unit of the copolymer (B) include, but are not specifically limited to, styrene, α-methylstyrene, vinyltoluene, and divinyl benzene. Of these aromatic vinyl monomers, styrene is preferable.

One aromatic vinyl monomer may be used individually, or two or more aromatic vinyl monomers may be used in combination in a freely selected ratio.

The proportion constituted by the aromatic vinyl monomer unit in the copolymer (B) is preferably at least 10 mass %, more preferably at least 30 mass %, even more preferably at least 50 mass %, and particularly preferably at least 55 mass %, and is preferably no greater than 90 mass %, more preferably no greater than 80 mass %, even more preferably no greater than 70 mass %, and particularly preferably no greater than 65 mass %. As a result of the proportion constituted by the aromatic vinyl monomer unit in the second particulate polymer being within any of the aforementioned ranges, a secondary battery can be caused to display excellent cycle characteristics.

The copolymer (B) may include other monomer units besides the conjugated diene monomer unit and the aromatic vinyl monomer unit described above.

Specific examples of other monomer units that the copolymer (B) may include in addition to the conjugated diene monomer unit and the aromatic vinyl monomer unit include an ethylenically unsaturated carboxylic acid monomer unit, a vinyl cyanide monomer unit, a (meth)acrylic acid ester monomer unit, a hydroxyalkyl group-containing unsaturated monomer unit, and an unsaturated carboxylic acid amide monomer unit.

Examples of ethylenically unsaturated carboxylic acid monomers that can be used to form the ethylenically unsaturated carboxylic acid monomer unit of the copolymer (B) include, but are not specifically limited to, the same ethylenically unsaturated carboxylic acid monomers as can be used for the copolymer (A). Of these ethylenically unsaturated carboxylic acid monomers, acrylic acid, methacrylic acid, and itaconic acid are preferable.

One ethylenically unsaturated carboxylic acid monomer may be used individually, or two or more ethylenically unsaturated carboxylic acid monomers may be used in combination in a freely selected ratio.

The proportion constituted by the ethylenically unsaturated carboxylic acid monomer unit in the copolymer (B) is preferably at least 0.1 mass %, more preferably at least 0.2 mass %, and even more preferably at least 0.3 mass %, and is preferably no greater than 10 mass %, more preferably no greater than 8 mass %, and even more preferably no greater than 5 mass %.

Examples of vinyl cyanide monomers that can be used to form the vinyl cyanide monomer unit of the copolymer (B) include, but are not specifically limited to, the same vinyl cyanide monomers as can be used for the copolymer (A). Of these vinyl cyanide monomers, acrylonitrile and methacrylonitrile are preferable.

One vinyl cyanide monomer may be used individually, or two or more vinyl cyanide monomers may be used in combination in a freely selected ratio.

The proportion constituted by the vinyl cyanide monomer unit in the copolymer (B) is preferably at least 0.1 mass %, and more preferably at least 1 mass %, and is preferably no greater than 10 mass %, more preferably no greater than 8 mass %, and even more preferably no greater than 3 mass %.

Examples of (meth)acrylic acid ester monomers that can be used to form the (meth)acrylic acid ester monomer unit of the copolymer (B) include, but are not specifically limited to, the same (meth)acrylic acid ester monomers as can be used for the copolymer (A).

One (meth)acrylic acid ester monomer may be used individually, or two or more (meth)acrylic acid ester monomers may be used in combination in a freely selected ratio.

The proportion constituted by the (meth)acrylic acid ester monomer unit in the copolymer (B) is preferably from 0 mass % to 10 mass %, more preferably no greater than 8 mass %, and even more preferably no greater than 5 mass %.

Examples of hydroxyalkyl group-containing unsaturated monomers that can be used to form the hydroxyalkyl group-containing unsaturated monomer unit of the copolymer (B) include β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di(ethylene glycol) maleate, di(ethylene glycol) itaconate, 2-hydroxyethyl maleate, bis(2-hydroxyethyl) maleate, and 2-hydroxyethyl methyl maleate. Of these hydroxyalkyl group-containing unsaturated monomers, β-hydroxyethyl acrylate is preferable.

One hydroxyalkyl group-containing unsaturated monomer may be used individually, or two or more hydroxyalkyl group-containing unsaturated monomers may be used in combination in a freely selected ratio.

The proportion constituted by the hydroxyalkyl group-containing unsaturated monomer unit in the copolymer (B) is preferably at least 0.1 mass %, more preferably at least 0.2 mass %, and even more preferably at least 0.3 mass %, and is preferably no greater than 10 mass %, more preferably no greater than 5 mass %, and even more preferably no greater than 3 mass %.

Examples of unsaturated carboxylic acid amide monomers that can be used to form the unsaturated carboxylic acid amide monomer unit of the copolymer (B) include acrylamide, methacrylamide, N-methylolacrylamide, N-methylolmethacrylamide, and N,N-dimethylacrylamide. Of these unsaturated carboxylic acid amide monomers, acrylamide and methacrylamide are preferable.

One unsaturated carboxylic acid amide monomer may be used individually, or two or more unsaturated carboxylic acid amide monomers may be used in combination in a freely selected ratio.

The proportion constituted by the unsaturated carboxylic acid amide monomer unit in the copolymer (B) is preferably from 0 mass % to 10 mass %, more preferably no greater than 8 mass %, and even more preferably no greater than 5 mass %.

The second particulate polymer constituted by the copolymer (B) described above can be produced, for example, through polymerization, in an aqueous solvent, of a monomer composition containing the monomers described above, in the same way as for the first particulate polymer. The proportion constituted by each monomer in the monomer composition is normally the same as the proportion constituted by the corresponding repeating unit in the target copolymer (B).

[Content of Particulate Polymers]

The content of the first particulate polymer in the presently disclosed binder composition, in terms of solid content per 100 parts by mass, in total, of the first particulate polymer and the second particulate polymer, is preferably at least 30 parts by mass, more preferably at least 50 parts by mass, and even more preferably at least 70 parts by mass, and is preferably no greater than 95 parts by mass, more preferably no greater than 90 parts by mass, and even more preferably no greater than 85 parts by mass. As a result of the content of the first particulate polymer being within any of the aforementioned ranges, secondary battery rate characteristics and cycle characteristics can both be achieved to high levels. If the proportion constituted by the first particulate polymer is excessively small, it may not be possible to sufficiently reduce the resistance of an electrode mixed material layer. On the other hand, if the proportion constituted by the second particulate polymer is excessively small and the proportion constituted by the first particulate polymer is excessively large, it may not be possible to sufficiently suppress electrode expansion.

<Other Components>

In addition to the particulate binder (first particulate polymer and second particulate polymer) described above, the presently disclosed binder composition may contain a water-soluble polymer, a conductive additive, a reinforcing material, a leveling agent, a viscosity modifier, an additive for electrolysis solution, or the like. These other components are not specifically limited so long as they do not affect the battery reactions and may be selected from commonly known components such as those described in WO 2012/115096 A1. One of such components may be used individually, or two or more of such components may be used in combination in a freely selected ratio.

<Production of Binder Composition>

The presently disclosed binder composition can be produced by dispersing the components described above in an aqueous medium that serves as a dispersion medium. Specifically, the binder composition can be produced by mixing the above-described components and the aqueous medium, such as water, using a mixer such as a ball mill, a sand mill, a bead mill, a pigment disperser, a grinding machine, an ultrasonic disperser, a homogenizer, a planetary mixer, or a FILMIX.

Note that in a situation in which the particulate polymers are each produced through polymerization of a monomer composition in an aqueous solvent, the particulate polymers can each be mixed in the form of a produced aqueous dispersion. Moreover, in a situation in which the particulate polymers are each mixed in the form of an aqueous dispersion, water contained in these aqueous dispersions may serve as the aforementioned aqueous medium.

(Slurry Composition for Secondary Battery Electrode)

The presently disclosed slurry composition for a secondary battery electrode is an aqueous slurry composition having an aqueous medium as a dispersion medium and containing an electrode active material and the previously described binder composition. In other words, the presently disclosed slurry composition for a secondary battery electrode contains at least an electrode active material, the previously described particulate binder (first particulate polymer and second particulate polymer), and a dispersion medium such as water, and may optionally further contain other components. As a result of the presently disclosed slurry composition for a secondary battery electrode containing the previously described binder composition, an electrode including an electrode mixed material layer formed using the slurry composition has excellent peel strength and can cause a secondary battery in which the electrode is used to display excellent rate characteristics and cycle characteristics.

Although the following describes an example in which the slurry composition for a secondary battery electrode is a slurry composition for a lithium ion secondary battery electrode, the presently disclosed slurry composition for a secondary battery electrode is not limited to the following example.

<Electrode Active Material>

The electrode active material is a substance that accepts and donates electrons in an electrode (positive/negative electrode) of a lithium ion secondary battery. In the case of a lithium ion secondary battery, the electrode active material (positive/negative electrode active material) is normally a material that can occlude and release lithium.

[Positive Electrode Active Material]

Specific examples of the positive electrode active material include transition metal-containing compounds, such as a transition metal oxide, a transition metal sulfide, and a composite metal oxide comprising lithium and a transition metal. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O-P_2O_5$, amorphous $MoO_3$, amorphous $V_2O_5$, and amorphous $V_6O_{13}$.

Examples of the transition metal sulfide include $TiS_2$, $TiS_3$, amorphous $MoS_2$, and FeS.

Examples of the composite metal oxide comprising lithium and a transition metal include a lithium-containing composite metal oxide with a layered structure, a lithium-containing composite metal oxide with a spinel structure, and a lithium-containing composite metal oxide with an olivine structure.

Examples of the lithium-containing composite metal oxide with a layered structure include lithium-containing cobalt oxide ($LiCoO_2$), lithium-containing nickel oxide ($LiNiO_2$), lithium-containing composite oxide of Co—Ni—Mn ($Li(CoMnNi)O_2$), lithium-containing composite oxide of Ni—Mn—Al, lithium-containing composite oxide of Ni—Co—Al, and a solid solution comprising $LiMaO_2$ and $Li_2MbO_3$. Examples of the lithium-containing composite oxide of Co—Ni—Mn include $Li[Ni_{0.5}Co_{0.2}Mn_{0.3}]O_2$ and $Li[Ni_{1/3}Co_{1/3}Mn_{1/3}]O_2$. Examples of the solid solution comprising $LiMaO_2$ and $Li_2MbO_3$ include $xLiMaO_2\cdot(1-x)Li_2MbO_3$ and the like, where x represents a number satisfying $0<x<1$, Ma represents one or more types of transition metals with an average oxidation state of 3+, and Mb represents one or more types of transition metals with an average oxidation state of 4+. Examples of solid solutions such as described above include $Li[Ni_{0.17}Li_{0.2}Co_{0.07}Mn_{0.56}]O_2$.

The term "average oxidation state" as used herein refers to an average oxidation state of the "one or more types of transition metals" and is calculated from the molar quantities and the valences of the transition metals. For example, in a situation in which the "one or more types of transition metals" is made up of 50 mol % of $Ni^{2+}$ and 50 mol % of $Mn^{4+}$, the average oxidation state of the "one or more types of transition metals" is $(0.5)\times(2+)+(0.5)\times(4+)=3+$.

Examples of the lithium-containing composite metal oxide with a spinel structure include lithium manganate ($LiMn_2O_4$) and compounds obtained by substituting part of Mn contained in lithium manganate ($LiMn_2O_4$) with another transition metal. One specific example thereof is $Li_s[Mn_{2-t}Mc_t]O_4$, such as $LiNi_{0.5}Mn_{1.5}O_4$, where Mc represents one or more types of transition metals having an average oxidation state of 4+, specific examples of which include Ni, Co, Fe, Cu, and Cr; t represents a number satisfying $0<t<1$; and s represents a number satisfying $0\leq s\leq 1$. Another example of the positive electrode active material is lithium-rich spinel compounds represented by $Li_{1+x}Mn_{2-x}O_4$ ($0<x<2$).

Examples of the lithium-containing composite metal oxide with an olivine structure include olivine-type lithium phosphate compounds represented by the formula $Li_yMdPO_4$, such as olivine-type lithium iron phosphate ($LiFePO_4$) and olivine-type manganese lithium phosphate ($LiMnPO_4$), where Md represents one or more types of transition metals having an average oxidation state of 3+, examples of which include Mn, Fe, and Co, and y represents a number satisfying $0\leq y\leq 2$. Md of the olivine-type lithium phosphate compounds represented by the formula $Li_yM$-$dPO_4$ may be partly substituted with another metal. Examples of the metal possibly substituting the part of Md include Cu, Mg, Zn, V, Ca, Sr, Ba, Ti, Al, Si, B, and Mo.

[Negative Electrode Active Material]

Examples of the negative electrode active material include a carbon-based negative electrode active material, a metal-based negative electrode active material, and a negative electrode active material formed by combining these materials.

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

A carbonaceous material is a material with a low degree of graphitization (i.e., low crystallinity) that can be obtained by carbonizing a carbon precursor by heat treatment at 2000° C. or lower. The lower limit of the heat treatment temperature in the carbonization is not specifically limited and may for example be 500° C. or higher.

Examples of the carbonaceous material include graphitizing carbon whose carbon structure can easily be changed according to the heat treatment temperature and non-graphitizing carbon typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include sintered phenolic resin, polyacrylonitrile-based carbon fiber, quasi-isotropic carbon, sintered furfuryl alcohol resin (PFA), and hard carbon.

The graphitic material is a material having high crystallinity of a similar level to graphite. The graphitic material can be obtained by heat-treating graphitizing carbon at 2000° C. or higher. The upper limit of the heat treatment temperature is not specifically limited and may for example be 5000° C. or lower.

Examples of the graphitic material include natural graphite and artificial graphite.

Examples of the artificial graphite include an artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material is an active material that contains metal, the structure of which usually contains an element that allows insertion of lithium, and that exhibits a theoretical electric capacity per unit mass of 500 mAh/g when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. The capacity of a lithium ion secondary battery can be increased though use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One type of silicon-based negative electrode active material may be used individually, or two or more types of silicon-based negative electrode active materials may be used in combination.

The silicon-containing alloy may be, for example, an alloy composition that contains silicon, aluminum, and transition metals such as iron, and further contains rare-earth elements such as tin and yttrium.

$SiO_x$ is a compound that contains Si and at least one of SiO and $SiO_2$, where x is usually at least 0.01 and less than 2. $SiO_x$ can for example be formed by utilizing a disproportionation reaction of silicon monoxide (SiO). Specifically, $SiO_x$ can be prepared by heat-treating SiO, optionally in the presence of a polymer such as polyvinyl alcohol, to produce silicon and silicon dioxide. After SiO has optionally been pulverized and mixed with the polymer, the heat treatment can be performed at a temperature of 900° C. or higher, and preferably 1000° C. or higher, in an atmosphere containing organic gas and/or vapor.

The composite of a Si-containing material and conductive carbon may be, for example, a compound obtained, for example, by heat-treating a pulverized mixture of SiO, a polymer such as polyvinyl alcohol, and optionally a carbon material in an atmosphere containing organic gas and/or vapor. Furthermore, a commonly known method can be used to obtain the composite, such as a method of coating the surfaces of particles of SiO with organic gas or the like by chemical vapor deposition, or a method of forming composite particles (granulation) by a mechanochemical process using SiO particles and graphite or artificial graphite.

<Binder Composition>

The binder composition contained in the slurry composition for a lithium ion secondary battery electrode can be the presently disclosed binder composition for a secondary battery electrode containing the previously described first and second particulate polymers and water.

The blending amount of the binder composition is not specifically limited. However, the total amount of the first particulate polymer and the second particulate polymer, in terms of solid content, may for example be at least 0.5 parts by mass and no greater than 3.0 parts by mass per 100 parts by mass of the electrode active material.

<Other Components>

Examples of other components that may be contained in the slurry composition include, but are not specifically limited to, the same other components that may be contained in the presently disclosed binder composition. One of such other components may be used individually, or two or more of such other components may be used in combination in a freely selected ratio.

<Production of Slurry Composition>

The slurry composition described above can be produced by dispersing the above-described components in an aqueous medium that serves as a dispersion medium. Specifically, the slurry composition can be produced by mixing the above-described components with the aqueous medium using a mixer such as a ball mill, a sand mill, a bead mill, a pigment disperser, a grinding machine, an ultrasonic disperser, a homogenizer, a planetary mixer, or a FILMIX. Mixing of the above-described components with the aqueous medium may normally be performed for a period of from 10 minutes to several hours in a temperature range of from room temperature to 80° C.

Although water is normally used as the aqueous medium, alternatively, an aqueous solution of a freely selected compound or a mixed solution of a small amount of an organic medium and water may be used. Note that water used as the aqueous medium may include water that was contained in the binder composition.

(Electrode for Secondary Battery)

The above-described slurry composition for a secondary battery electrode (slurry composition for a negative/positive electrode) produced using the presently disclosed binder composition for a secondary battery electrode can be used in order to produce an electrode (negative/positive electrode) for a secondary battery.

Herein, the electrode for a secondary battery includes a current collector and an electrode mixed material layer that is formed on the current collector. The electrode mixed material layer contains at least an electrode active material and the previously described particulate binder (first particulate polymer and second particulate polymer). It should be noted that components contained in the electrode mixed material layer are components that are contained in the previously described slurry composition for a secondary battery electrode. Furthermore, the preferred ratio of these components in the electrode mixed material layer is the same as the preferred ratio of these components in the slurry composition.

As a result of the electrode for a secondary battery being produced using the presently disclosed binder composition for a secondary battery electrode, the electrode for a secondary battery has high peel strength and can cause a secondary battery to display excellent rate characteristics and cycle characteristics.

<Production Method of Electrode for Secondary Battery>

The presently disclosed electrode for a secondary battery can be produced, for example, through a step of applying the previously described slurry composition for a secondary battery electrode onto the current collector (application step) and a step of drying the slurry composition for a secondary battery electrode that has been applied onto the current collector to form an electrode mixed material layer on the current collector (drying step).

The electrode for a secondary battery can also be produced by a method in which composite particles are prepared through drying granulation of the previously described slurry composition for a secondary battery electrode and these composite particles are then used to form an electrode mixed material layer on the current collector.

[Application Step]

The previously described slurry composition for a secondary battery electrode can be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. Of these materials, copper foil is particularly preferable as a current collector for a negative electrode. On the other hand, aluminum foil is particularly preferable as a current collector for a positive electrode. One of such materials may be used individually, or two or more of such materials may be used in combination in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition for an electrode on the current collector as described above, an electrode mixed material layer is formed on the current collector, thereby providing an electrode for a secondary battery that includes the current collector and the electrode mixed material layer.

After the drying step, the electrode mixed material layer may be further subjected to pressing treatment (pressing process), such as mold pressing or roll pressing. The pressing process can improve close adherence between the electrode mixed material layer and the current collector. Moreover, a higher density electrode mixed material layer and a more compact secondary battery can be obtained as a result.

Furthermore, when the electrode mixed material layer contains a curable polymer, the polymer is preferably cured after the electrode mixed material layer has been formed.

In a situation in which the electrode mixed material layer is subjected to a pressing process in order to increase the density of the electrode mixed material layer, the pressing process is preferably carried out such that the porosity of the electrode mixed material layer is preferably at least 10.7%, more preferably at least 15.2%, and even more preferably at least 17.4%. Moreover, the pressing process is preferably carried out such that the porosity of the electrode mixed material layer is preferably no greater than 24.1%, more preferably no greater than 22.8%, and even more preferably no greater than 21.9%. Through use of the presently disclosed binder composition for a secondary battery electrode, a secondary battery electrode can be caused to display excellent rate characteristics and cycle characteristics compared to when other binder compositions are used, particularly in a situation in which the density of the electrode mixed material layer is increased to the extent that the electrode mixed material layer has a porosity of no greater than 24.1%. However, it should be noted that even when the presently disclosed binder composition for a secondary battery electrode is used, lowering of rate characteristics and cycle characteristics may occur if the porosity of the electrode mixed material layer is less than 10.7%.

In a situation in which the electrode mixed material layer is, for example, a negative electrode mixed material layer, the bulk density of the negative electrode mixed material layer is preferably at least 1.70 $g/cm^3$, more preferably at least 1.73 $g/cm^3$, and even more preferably at least 1.75 $g/cm^3$, and is preferably no greater than 2.00 $g/cm^3$, more preferably no greater than 1.90 $g/cm^3$, and even more preferably no greater than 1.85 $g/cm^3$. Through use of the presently disclosed binder composition for a secondary battery electrode, a secondary battery can be caused to display excellent rate characteristics and cycle characteristics compared to when other binder compositions are used, even in a situation in which the density of the negative electrode mixed material layer is increased to the extent that the bulk density of the negative electrode mixed material layer is at least 1.70 g/cm³. However, it should be noted that even when the presently disclosed binder composition for a secondary battery electrode is used, lowering of rate characteristics and cycle characteristics may occur if the density of the negative electrode mixed material layer is increased to the extent that the bulk density thereof is greater than 2.00 g/cm³.

(Secondary Battery)

The presently disclosed secondary battery includes a positive electrode, a negative electrode, an electrolysis solution, and a separator. In the presently disclosed secondary battery, either or both of the positive electrode and negative electrode are the presently disclosed electrode for a secondary battery. The presently disclosed secondary battery has excellent rate characteristics and cycle characteristics as a result of including the presently disclosed electrode for a secondary battery.

Although the following describes an example in which the secondary battery is a lithium ion secondary battery, the presently disclosed secondary battery is not limited to the following example.

<Electrodes>

As explained above, the presently disclosed electrode for a secondary battery is used as either or both of the positive electrode and the negative electrode. In other words, the positive electrode of the lithium ion secondary battery may be the presently disclosed electrode and the negative electrode of the lithium ion secondary battery may be a known negative electrode other than the presently disclosed electrode. Alternatively, the negative electrode of the lithium ion secondary battery may be the presently disclosed electrode and the positive electrode of the lithium ion secondary battery may be a known positive electrode other than the presently disclosed electrode. Further alternatively, the positive electrode and the negative electrode of the lithium ion secondary battery may both be the presently disclosed electrode.

<Electrolysis Solution>

The electrolysis solution may be formed by dissolving an electrolyte in a solvent.

The solvent may be an organic solvent that can dissolve an electrolyte. Specifically, the solvent may be an alkyl carbonate solvent to which a viscosity modification solvent is added. Examples of the alkyl carbonate solvent include ethylene carbonate, propylene carbonate, and γ-butyrolactone. Examples of the viscosity modification solvent include 2,5-dimethyltetrahydrofuran, tetrahydrofuran, diethyl carbonate, ethyl methyl carbonate, dimethyl carbonate, methyl acetate, dimethoxyethane, dioxolane, methyl propionate, and methyl formate.

The electrolyte may be a lithium salt. Examples of lithium salts that may be used include those described in JP 2012-204303 A. Of these lithium salts, $LiPF_6$, $LiClO_4$, and $CF_3SO_3Li$ are preferred as electrolytes because they readily dissolve in organic solvents and exhibit a high degree of dissociation.

<Separator>

Examples of the separator include separators described in JP 2012-204303 A. Of these separators, a fine porous membrane made of polyolefinic resin (polyethylene, polypropylene, polybutene, or polyvinyl chloride) is preferred since such a membrane can reduce the total thickness of the separator, which increases the ratio of an electrode active material in the lithium ion secondary battery, and consequently increases the capacity per unit volume.

<Production Method of Lithium Ion Secondary Battery>

The lithium ion secondary battery may be produced, for example, by stacking the positive electrode and the negative electrode with the separator in-between, rolling or folding the resultant stack as necessary in accordance with the battery shape to place the stack in a battery container, filling the battery container with the electrolysis solution, and sealing the battery container. In order to prevent pressure increase inside the lithium ion secondary battery and occurrence of overcharging or overdischarging, an overcurrent preventing device such as a PTC device or a fuse; an expanded metal; or a lead plate may be provided as necessary. The shape of the lithium ion secondary battery may be, for example, a coin type, button type, sheet type, cylinder type, prismatic type, or flat type.

EXAMPLES

The following provides a more specific description of the present disclosure based on examples. However, the present disclosure is not limited to the following examples. In the following, "%" and "parts" used to express quantities are by mass, unless otherwise specified.

In the examples and comparative examples, evaluations were performed by the following methods in order to evaluate the degree of swelling in electrolysis solution, glass transition temperature, and number average particle diameter of a particulate polymer, the peel strength, porosity, and bulk density of an electrode, and the rate characteristics and cycle characteristics of a secondary battery.

<Degree of Swelling in Electrolysis Solution>

An aqueous dispersion containing a particulate polymer was prepared and a film with a thickness of 3±0.3 mm was formed by drying the aqueous dispersion for three days in an environment of 50% humidity and a temperature of from 23° C. to 25° C. The resultant film was cut to a diameter of 12 mm and was precisely weighed.

The mass of the film piece obtained by this cutting was taken to be W0. The film piece was immersed in 50 g of an electrolysis solution (composition: $LiPF_6$ solution of 1.0 M in concentration (mixed solvent of 3/7 (weight ratio) ethylene carbonate/ethyl methyl carbonate used as solvent; 2 volume % (solvent ratio) of vinylene carbonate added as additive)) for 72 hours at an ambient temperature of 60° C., and was allowed to swell. Thereafter, the film piece (swollen film piece) was pulled out of the electrolysis solution, was wiped gently, and the mass W1 thereof was measured.

The degree of swelling (mass %) was calculated according to the following formula.

$$\text{Degree of swelling(mass \%)} = (W1/W0) \times 100$$

<Glass Transition Temperature>

A measurement sample was prepared by drying an aqueous dispersion containing a particulate polymer. The glass transition temperature of the measurement sample was measured using a differential themoanalyzer (produced by SII Technology, product name: EXSTAR DSC6220).

Specifically, 10 mg of the measurement sample was weighed into an aluminum pan and a DSC curve was measured with respect to the measurement sample under normal temperature and humidity with a measurement temperature range of from −100° C. to 500° C. and a heating rate of 10° C./minute, and using an empty aluminum pan as a reference. The glass transition temperature was determined from an intersection point of a base line directly before a heat absorption peak on the DSC curve at which a derivative signal (DDSC) was at least 0.05 mW/minute/mg in a heating process and a tangent to the DSC curve at a first inflection point to appear after the heat absorption peak.

<Number Average Particle Diameter>

The number average particle diameter of a particulate polymer was measured using a laser diffraction/scattering particle size distribution analyzer (LS230 produced by Beckman Coulter, Inc.).

Specifically, the laser diffraction/scattering particle size distribution analyzer was used to measure a particle diameter-cumulative number distribution for the particulate polymer with respect to an aqueous dispersion containing the particulate polymer, and the number average particle diameter of the particulate polymer was taken to be a particle diameter at which a value of the cumulative distribution reached 50%.

<Electrode Peel Strength>

A specimen having a rectangular shape of 1.0 cm in width by 10 cm in length was cut out from a produced negative electrode for a lithium ion secondary battery and was fixed such that the surface at a negative electrode mixed material layer side of the specimen was on top. Cellophane tape was then attached to the surface at the negative electrode mixed material layer side of the specimen. Tape prescribed by JIS Z1522 was used as the cellophane tape. The cellophane tape was then peeled off from one end of the specimen at a rate of 50 mm/minute and an angle of 180° (i.e., in a direction toward the other end of the specimen) while measuring the stress during peeling. This measurement was performed 10 times to obtain an average value of the stress. The average value was taken to be the peel strength (N/m) and was evaluated by the following standard. A greater peel strength indicates better binding of the negative electrode mixed material layer to the current collector.

A: Peel strength of at least 8 N/m
B: Peel strength of at least 5 N/m and less than 8 N/m
C: Peel strength of at least 3 N/m and less than 5 N/m
D: Peel strength of less than 3 N/m <Porosity and Bulk Density>

The porosity and bulk density of a negative electrode mixed material layer of a produced negative electrode for a lithium ion secondary battery were calculated based on the following formulae. Note that the true density of the negative electrode mixed material layer was calculated from the density (theoretical value) of solid content contained in a slurry composition used to form the negative electrode mixed material layer.

Bulk density($g/cm^3$)=Mass per unit area of negative electrode mixed material layer/Thickness of negative electrode mixed material layer Porosity (%)={1−(Bulk density of negative electrode mixed material layer/True density of negative electrode mixed material layer)}×100

<Secondary Battery Rate Characteristics>

A produced pouch lithium ion secondary battery was left for 24 hours and was then subjected to an operation in which the lithium ion secondary battery was charged to 4.4 V and discharged to 3.0 V at a charge/discharge rate of 0.2 C. Thereafter, a charge/discharge cycle was carried out at 25° C. in which the lithium ion secondary battery was charged to 4.4 V at a charge rate of 0.2 C and discharged to 3.0 V at a discharge rate of 1.0 C and a charge/discharge cycle was carried out at 25° C. in which the lithium ion secondary battery was charged to 4.4 V at a charge rate of 0.2 C and discharged to 3.0 V at a discharge rate of 3.0 C. The battery capacity at 3.0 C was calculated as a percentage relative to the battery capacity at 1.0 C. The calculated percentage was taken to be a charge/discharge rate characteristic and was evaluated by the following standard. A higher charge/discharge rate characteristic indicates lower internal resistance and capability for high-speed charging and discharging, and thus indicates better rate characteristics.

A: Charge/discharge rate characteristic of at least 70%
B: Charge/discharge rate characteristic of at least 65% and less than 70%
C: Charge/discharge rate characteristic of at least 60% and less than 65%
D: Charge/discharge rate characteristic of less than 60%

<Secondary Battery Cycle Characteristics>

A produced pouch lithium ion secondary battery was left for 24 hours and was then subjected to an operation in which the lithium ion secondary battery was charged to 4.4 V and discharged to 3.0 V at a charge/discharge rate of 0.2 C. The initial capacity C0 in this operation was measured. Charge/discharge cycles in which the lithium ion secondary battery was charged to 4.4 V and discharged to 3.0 V at a charge/discharge rate of 1.0 C were carried out repeatedly at an ambient temperature of 45° C., and the capacity C1 after 300 cycles was measured. High-temperature cycle characteristics were evaluated based on the rate of capacity maintenance indicated by $\Delta C=(C1/C0)\times 100(\%)$. A higher rate of capacity maintenance indicates a smaller decrease of discharge capacity, and thus indicates better high-temperature cycle characteristics.

A: Rate of capacity maintenance $\Delta C$ of at least 80%
B: Rate of capacity maintenance $\Delta C$ of at least 75% and less than 80%
C: Rate of capacity maintenance $\Delta C$ of at least 70% and less than 75%
D: Rate of capacity maintenance $\Delta C$ of less than 70%

Example 1

<Production of First Particulate Polymer>

A reaction vessel equipped with a stirrer was charged with 96.0 parts of butyl acrylate as a (meth)acrylic acid ester monomer, 2.0 parts of methacrylic acid as an ethylenically unsaturated carboxylic acid monomer, 2.0 parts of acrylonitrile as a vinyl cyanide monomer, 0.3 parts of sodium dodecylbenzenesulfonate as an emulsifier, 0.3 parts of ammonium persulfate as a polymerization initiator, and 300 parts of deionized water. The contents of the reaction vessel were sufficiently stirred and were then heated to 70° C. A reaction was allowed to proceed for 4 hours, and then the contents of the reaction vessel were heated to 80° C. and were aged for 3 hours to complete the reaction. The resultant aqueous dispersion containing a polymer was cooled to 30° C. or lower. As a result, an aqueous dispersion was obtained of a first particulate polymer in the form of particles having a number average particle diameter of 350 nm. The degree of swelling in electrolysis solution and glass transition temperature of the first particulate polymer were measured. The results are shown in Table 1.

<Production of Second Particulate Polymer>

A 5 MPa pressure vessel equipped with a stirrer was charged with 33.2 parts of 1,3-butadiene as a conjugated diene monomer, 3.8 parts of itaconic acid as an ethylenically unsaturated carboxylic acid monomer, 62.0 parts of styrene as an aromatic vinyl monomer, 1 part of 2-hydroxyethyl acrylate as a hydroxyalkyl group-containing unsaturated monomer, 0.3 parts of t-dodecyl mercaptan as a molecular weight modifier, 0.3 parts of sodium dodecylbenzenesulfonate as an emulsifier, 150 parts of deionized water, and 1.0 parts of potassium persulfate as a polymerization initiator.

The contents of the pressure vessel were sufficiently stirred and were then heated to 50° C. to initiate polymerization. Cooling was performed to terminate the reaction at the point at which the polymerization conversion rate reached 96%. The resultant aqueous dispersion containing a polymer was adjusted to pH 8 through addition of 5% sodium hydroxide aqueous solution. Thereafter, unreacted monomers were removed by heated vacuum distillation. Cooling was then performed to 30° C. or lower. As a result, an aqueous dispersion was obtained of a second particulate polymer in the form of particles having a number average particle diameter of 145 nm. The degree of swelling in electrolysis solution and glass transition temperature of the second particulate polymer were measured. The results are shown in Table 1.

<Production of Slurry Composition for Lithium Ion Secondary Battery Negative Electrode>

A planetary mixer equipped with a disper blade was charged with 98.0 parts of artificial graphite (specific surface area: 3.6 $m^2/g$, volume average particle diameter: 20 μm) as a negative electrode active material and 1 part by solid content equivalents of a 1% aqueous solution of a carboxymethyl cellulose sodium salt (CMC-Na) as a viscosity modifier. The resultant mixture was adjusted to a solid content concentration of 60% using deionized water and was then mixed for 60 minutes at 25° C.

Subsequently, the mixture was adjusted to a solid content concentration of 52% using deionized water and was then further mixed for 15 minutes at 25° C. to yield a mixed liquid.

Next, 1 part by solid content equivalents of a binder composition obtained by mixing the aqueous dispersion of the first particulate polymer and the aqueous dispersion of the second particulate polymer in a ratio shown in Table 1 (first particulate polymer:second particulate polymer (mass ratio)=80:20) was added to the mixed liquid. Deionized water was also added in order to adjust the final solid content concentration to 50% and a further 10 minutes of mixing was carried out. The resultant mixture was subjected to a defoaming process under reduced pressure to yield a slurry composition for a negative electrode.

<Production of Negative Electrode for Lithium Ion Secondary Battery>

A comma coater was used to apply the produced slurry composition for a negative electrode onto copper foil (current collector) of 15 μm in thickness such as to have a mass per unit area of from 13.5 mg/$cm^2$ to 14.5 mg/$cm^2$. The slurry composition for a negative electrode was dried by conveying the copper foil inside a 70° C. oven for 2 minutes at a speed of 0.5 m/minute. Heat treatment was subsequently performed for 2 minutes at 120° C. to obtain a negative electrode web. Next, the obtained negative electrode web was pressed by a roll press such that the bulk density of a negative electrode mixed material layer was 1.82 g/$cm^3$ and the pressed product was used as a negative electrode. After pressing, the negative electrode mixed material layer had a mass per unit area of 14.0 mg/$cm^2$ and a porosity of 18.8%.

The peel strength of the produced negative electrode was evaluated. The results are shown in Table 1.

<Production of Positive Electrode for Lithium Ion Secondary Battery>

A slurry composition for a positive electrode was obtained by adding, into a planetary mixer, 96.0 parts of $LiCoO_2$ as a positive electrode active material, 2.0 parts of acetylene black (HS-100 produced by Denki Kagaku Kogyo Kabushiki Kaisha) as a conductive additive, and 2.0 parts of PVDF (polyvinylidene fluoride, KF-1100 produced by Kureha Corporation) as a binder, further adding N-methylpyrrolidone to adjust the total solid content concentration to 67%, and then carrying out mixing.

A comma coater was used to apply the obtained slurry composition for a positive electrode onto aluminum foil (current collector) of 20 μm in thickness. The slurry composition for a positive electrode was dried by conveying the aluminum foil inside a 60° C. oven for 2 minutes at a speed of 0.5 m/minute. Heat treatment was subsequently performed for 2 minutes at 120° C. to obtain a positive electrode web. Next, the obtained positive electrode web was pressed by a roll press such that the bulk density of a positive electrode mixed material layer was 3.5 g/$cm^3$, and a positive electrode was thereby obtained.

<Production of Lithium Ion Secondary Battery>

A single-layer polypropylene separator (width 65 mm, length 500 mm, thickness 25 μm; produced by a dry method; porosity 55%) was prepared and a 5 cm×5 cm square shape was cut out therefrom. An aluminum packing case was also prepared as a battery case.

A 4 cm×4 cm square shape was cut out from the produced positive electrode and was arranged with a surface at the current collector side thereof in contact with the aluminum packing case. Next, the square separator was arranged on a surface at the positive electrode mixed material layer side of the positive electrode. Furthermore, a 4.2 cm×4.2 cm square shape was cut out from the produced negative electrode and was arranged on the separator such that a surface at the negative electrode mixed material layer side thereof faced toward the separator. Thereafter, the aluminum packing case was filled with a $LiPF_6$ solution of 1.0M in concentration as an electrolysis solution (mixed solvent of 3/7 (weight ratio) ethylene carbonate/ethyl methyl carbonate used as solvent; 2 volume % (solvent ratio) of vinylene carbonate added as additive). The aluminum packing case was then closed by heat sealing at 150° C. to tightly seal an opening of the aluminum packing case, and thereby produce a lithium ion secondary battery.

The rate characteristics and cycle characteristics of the produced lithium ion secondary battery were evaluated. The results are shown in Table 1.

Examples 2-7

In each example, a first particulate polymer having a degree of swelling in electrolysis solution and a glass transition temperature shown in Table 1 was produced in the same way as in Example 1 with the exception that the monomers shown in Table 1 were used in the proportions shown in Table 1. Moreover, a binder composition, a slurry composition for a negative electrode, a negative electrode, a positive electrode, and a secondary battery were produced in the same way as in Example 1 with the exception that the aforementioned first particulate polymer was used. Each evaluation was performed in the same way as in Example 1. The results are shown in Table 1.

Examples 8-13

In each example, a second particulate polymer having a degree of swelling in electrolysis solution and a glass transition temperature shown in Table 1 was produced in the same way as in Example 1 with the exception that the monomers shown in Table 1 were used in the proportions shown in Table 1. Moreover, a binder composition, a slurry composition for a negative electrode, a negative electrode, a positive electrode, and a secondary battery were produced in the same way as in Example 1 with the exception that the aforementioned second particulate polymer was used. Each evaluation was performed in the same way as in Example 1. The results are shown in Table 1.

Example 14

A binder composition, a slurry composition for a negative electrode, a negative electrode, a positive electrode, and a secondary battery were produced in the same way as in Example 1 with the exception that in production of the negative electrode for a lithium ion secondary battery, the negative electrode web was pressed using the roll press such that the bulk density of the negative electrode mixed material layer was 1.65 g/cm$^3$. The negative electrode mixed material layer had a porosity of 26.4%.

Each evaluation was performed in the same way as in Example 1. The results are shown in Table 1.

Example 15

A second particulate polymer having a number average particle diameter shown in Table 1 was produced in the same way as in Example 1 with the exception that the amount of sodium dodecylbenzenesulfonate used as an emulsifier was changed to 0.15 parts. Moreover, a binder composition, a slurry composition for a negative electrode, a negative electrode, a positive electrode, and a secondary battery were produced in the same way as in Example 1 with the exception that the aforementioned second particulate polymer was used. Each evaluation was performed in the same way as in Example 1. The results are shown in Table 1.

Comparative Examples 1 and 2

In each comparative example, a first particulate polymer having a degree of swelling in electrolysis solution and a glass transition temperature shown in Table 1 was produced in the same way as in Example 1 with the exception that the monomers shown in Table 1 were used in the proportions shown in Table 1. Moreover, a binder composition, a slurry composition for a negative electrode, a negative electrode, a positive electrode, and a secondary battery were produced in the same way as in Example 1 with the exception that the aforementioned first particulate polymer was used. Each evaluation was performed in the same way as in Example 1. The results are shown in Table 1.

Comparative Examples 3 and 4

In each comparative example, a second particulate polymer having a degree of swelling in electrolysis solution and a glass transition temperature shown in Table 1 was produced in the same way as in Example 1 with the exception that the monomers shown in Table 1 were used in the proportions shown in Table 1. Moreover, a binder composition, a slurry composition for a negative electrode, a negative electrode, a positive electrode, and a secondary battery were produced in the same way as in Example 1 with the exception that the aforementioned second particulate polymer was used. Each evaluation was performed in the same way as in Example 1. The results are shown in Table 1.

Comparative Example 5

A binder composition, a slurry composition for a negative electrode, a negative electrode, a positive electrode, and a secondary battery were produced in the same way as in Comparative Example 3 with the exception that in production of the negative electrode for a lithium ion secondary battery, the negative electrode web was pressed using the roll press such that the bulk density of the negative electrode mixed material layer was 1.65 g/cm$^3$. The negative electrode mixed material layer had a porosity of 26.4%.

Each evaluation was performed in the same way as in Example 1. The results are shown in Table 1.

In Table 1, shown below, the following abbreviations are used.

BA: Butyl acrylate (acrylic acid ester monomer)
MAA: Methacrylic acid (ethylenically unsaturated carboxylic acid monomer)
AN: Acrylonitrile (vinyl cyanide monomer)
NMA: N-Methylolacrylamide (crosslinkable monomer)
AMA: Allyl methacrylate (crosslinkable monomer)
AAmid: Acrylamide (unsaturated carboxylic acid amide monomer)
BD: 1,3-Butadiene (conjugated diene monomer)
ST: Styrene (aromatic vinyl monomer)
IA: Itaconic acid (ethylenically unsaturated carboxylic acid monomer)
β-HEA: 2-Hydroxyethyl acrylate (hydroxyalkyl group-containing unsaturated monomer)
CMC-Na: Carboxymethyl cellulose sodium salt

TABLE 1

| | | | | | Example 1 | Example 2 | Example 3 | Example 4 | Example 5 | Example 6 |
|---|---|---|---|---|---|---|---|---|---|---|
| Slurry composition | Binder composition | First particulate polymer | Composition [mass %] | BA | 96.0 | 97.0 | 95.0 | 94.7 | 91.0 | 87.8 |
| | | | | MAA | 2.0 | 2.0 | 2.0 | 2.0 | 2.0 | 2.0 |
| | | | | AN | 2.0 | 1.0 | 3.0 | 3.0 | 7.0 | 7.0 |
| | | | | NMA | — | — | — | — | — | 1.6 |
| | | | | AMA | — | — | — | 0.3 | — | — |
| | | | | AAmid | — | — | — | — | — | 1.6 |
| | | | Degree of swelling in electrolysis solution [mass %] | | 650 | 600 | 700 | 400 | 900 | 620 |
| | | | Glass transition temperature [° C.] | | −40 | −42 | −38 | −37 | −30 | −30 |
| | | | Number average particle diameter [nm] | | 350 | 350 | 350 | 350 | 350 | 350 |
| | | | Amount [parts by mass] | | 0.8 | 0.8 | 0.8 | 0.8 | 0.8 | 0.8 |
| | | Second particulate polymer | Composition [mass %] | BD | 33.2 | 33.2 | 33.2 | 33.2 | 33.2 | 33.2 |
| | | | | ST | 62.0 | 62.0 | 62.0 | 62.0 | 62.0 | 62.0 |
| | | | | IA | 3.8 | 3.8 | 3.8 | 3.8 | 3.8 | 3.8 |
| | | | | β-HEA | 1.0 | 1.0 | 1.0 | 1.0 | 1.0 | 1.0 |
| | | | | AN | — | — | — | — | — | — |

TABLE 1-continued

|  |  |  |  |  |  |  |  |  |  |  |
|---|---|---|---|---|---|---|---|---|---|---|
|  |  |  | Degree of swelling in electrolysis solution [mass %] |  |  | 150 | 150 | 150 | 150 | 150 | 150 |
|  |  |  | Glass transition temperature [° C.] |  |  | 10 | 10 | 10 | 10 | 10 | 10 |
|  |  |  | Number average particle diameter [nm] |  |  | 145 | 145 | 145 | 145 | 145 | 145 |
|  |  |  | Amount [parts by mass] |  |  | 0.2 | 0.2 | 0.2 | 0.2 | 0.2 | 0.2 |
|  |  |  | Proportion constituted by first particulate polymer [mass %] |  |  | 80 | 80 | 80 | 80 | 80 | 80 |
|  |  |  | Particle diameter ratio *1 [—] |  |  | 2.4 | 2.4 | 2.4 | 2.4 | 2.4 | 2.4 |
|  |  |  | Amount [parts by mass] |  |  | 1.0 | 1.0 | 1.0 | 1.0 | 1.0 | 1.0 |
|  |  | Negative electrode active material (artificial graphite) [parts by mass] |  |  |  | 98 | 98 | 98 | 98 | 98 | 98 |
|  |  | Viscosity modifier (CMC-Na) [parts by mass] |  |  |  | 1 | 1 | 1 | 1 | 1 | 1 |
| Negative electrode mixed material layer |  | Mass per unit area [mg/cm²] |  |  |  | 14.0 | 14.0 | 14.0 | 14.0 | 14.0 | 14.0 |
|  |  | Thickness [μm] |  |  |  | 77 | 77 | 77 | 77 | 77 | 77 |
|  |  | Porosity [%] |  |  |  | 18.8 | 18.8 | 18.8 | 18.8 | 18.8 | 18.8 |
|  |  | Bulk density [g/cm³] |  |  |  | 1.82 | 1.82 | 1.82 | 1.82 | 1.82 | 1.82 |
| Evaluation |  | Peel strength |  |  |  | A | A | A | A | A | A |
|  |  | Battery rate characteristics |  |  |  | A | A | A | B | A | B |
|  |  | Battery cycle characteristics |  |  |  | A | A | A | A | B | A |

|  |  |  |  |  |  | Example 7 | Example 8 | Example 9 | Example 10 | Example 11 | Example 12 |
|---|---|---|---|---|---|---|---|---|---|---|---|
| Slurry composition | Binder composition | First particulate polymer | Composition [mass %] | BA |  | 78.0 | 96.0 | 96.0 | 96.0 | 96.0 | 96.0 |
|  |  |  |  | MAA |  | 2.0 | 2.0 | 2.0 | 2.0 | 2.0 | 2.0 |
|  |  |  |  | AN |  | 14.0 | 2.0 | 2.0 | 2.0 | 2.0 | 2.0 |
|  |  |  |  | NMA |  | 3.0 | — | — | — | — | — |
|  |  |  |  | AMA |  | — | — | — | — | — | — |
|  |  |  |  | AAmid |  | 3.0 | — | — | — | — | — |
|  |  |  | Degree of swelling in electrolysis solution [mass %] |  |  | 630 | 650 | 650 | 650 | 650 | 650 |
|  |  |  | Glass transition temperature [° C.] |  |  | −15 | −40 | −40 | −40 | −40 | −40 |
|  |  |  | Number average particle diameter [nm] |  |  | 350 | 350 | 350 | 350 | 350 | 350 |
|  |  |  | Amount [parts by mass] |  |  | 0.8 | 0.8 | 0.8 | 0.8 | 0.8 | 0.8 |
|  |  | Second particulate polymer | Composition [mass %] | BD |  | 33.2 | 33.2 | 33.2 | 39.2 | 31.2 | 45.2 |
|  |  |  |  | ST |  | 62.0 | 61.0 | 56.0 | 56.0 | 64.0 | 50.0 |
|  |  |  |  | IA |  | 3.8 | 3.8 | 3.8 | 3.8 | 3.8 | 3.8 |
|  |  |  |  | β-HEA |  | 1.0 | 1.0 | 1.0 | 1.0 | 1.0 | 1.0 |
|  |  |  |  | AN |  | — | 1.0 | 6.0 | — | — | — |
|  |  |  | Degree of swelling in electrolysis solution [mass %] |  |  | 150 | 160 | 200 | 150 | 150 | 150 |
|  |  |  | Glass transition temperature [° C.] |  |  | 10 | 10 | 12 | 0 | 15 | −10 |
|  |  |  | Number average particle diameter [nm] |  |  | 145 | 145 | 145 | 145 | 145 | 145 |
|  |  |  | Amount [parts by mass] |  |  | 0.2 | 0.2 | 0.2 | 0.2 | 0.2 | 0.2 |
|  |  |  | Proportion constituted by first particulate polymer [mass %] |  |  | 80 | 80 | 80 | 80 | 80 | 80 |
|  |  |  | Particle diameter ratio *1 [—] |  |  | 2.4 | 2.4 | 2.4 | 2.4 | 2.4 | 2.4 |
|  |  |  | Amount [parts by mass] |  |  | 1.0 | 1.0 | 1.0 | 1.0 | 1.0 | 1.0 |
|  |  | Negative electrode active material (artificial graphite) [parts by mass] |  |  |  | 98 | 98 | 98 | 98 | 98 | 98 |
|  |  | Viscosity modifier (CMC-Na) [parts by mass] |  |  |  | 1 | 1 | 1 | 1 | 1 | 1 |
| Negative electrode mixed material layer |  | Mass per unit area [mg/cm²] |  |  |  | 14.0 | 14.0 | 14.0 | 14.0 | 14.0 | 14.0 |
|  |  | Thickness [μm] |  |  |  | 77 | 77 | 77 | 77 | 77 | 77 |
|  |  | Porosity [%] |  |  |  | 18.8 | 18.8 | 18.8 | 18.8 | 18.8 | 18.8 |
|  |  | Bulk density [g/cm³] |  |  |  | 1.82 | 1.82 | 1.82 | 1.82 | 1.82 | 1.82 |
| Evaluation |  | Peel strength |  |  |  | A | A | A | A | A | B |
|  |  | Battery rate characteristics |  |  |  | C | A | A | A | A | A |
|  |  | Battery cycle characteristics |  |  |  | A | A | C | A | A | B |

|  |  |  |  |  |  | Example 13 | Example 14 | Example 15 | Comparative Example 1 | Comparative Example 2 |
|---|---|---|---|---|---|---|---|---|---|---|
| Slurry composition | Binder composition | First particulate polymer | Composition [mass %] | BA |  | 96.0 | 96.0 | 96.0 | 95.3 | 74.8 |
|  |  |  |  | MAA |  | 2.0 | 2.0 | 2.0 | 2.0 | 2.0 |
|  |  |  |  | AN |  | 2.0 | 2.0 | 2.0 | 2.0 | 20.0 |
|  |  |  |  | NMA |  | — | — | — | — | 1.6 |
|  |  |  |  | AMA |  | — | — | — | 1.0 | — |
|  |  |  |  | AAmid |  | — | — | — | — | 1.6 |
|  |  |  | Degree of swelling in electrolysis solution [mass %] |  |  | 650 | 650 | 650 | 350 | 1080 |
|  |  |  | Glass transition temperature [° C.] |  |  | −40 | −40 | −40 | −40 | 0 |
|  |  |  | Number average particle diameter [nm] |  |  | 350 | 350 | 350 | 350 | 350 |
|  |  |  | Amount [parts by mass] |  |  | 0.8 | 0.8 | 0.8 | 0.8 | 0.8 |

TABLE 1-continued

| | | | | | | | | | |
|---|---|---|---|---|---|---|---|---|---|
| | Second particulate polymer | Composition [mass %] | BD | 22.2 | 33.2 | 33.2 | 33.2 | 33.2 |
| | | | ST | 73.0 | 62.0 | 62.0 | 62.0 | 62.0 |
| | | | IA | 3.8 | 3.8 | 3.8 | 3.8 | 3.8 |
| | | | β-HEA | 1.0 | 1.0 | 1.0 | 1.0 | 1.0 |
| | | | AN | — | — | — | — | — |
| | | Degree of swelling in electrolysis solution [mass %] | | 150 | 150 | 150 | 150 | 150 |
| | | Glass transition temperature [° C.] | | 30 | 10 | 10 | 10 | 10 |
| | | Number average particle diameter [nm] | | 145 | 145 | 300 | 145 | 145 |
| | | Amount [parts by mass] | | 0.2 | 0.2 | 0.2 | 0.2 | 0.2 |
| | | Proportion constituted by first particulate polymer [mass %] | | 80 | 80 | 80 | 80 | 80 |
| | | Particle diameter ratio *1 [—] | | 2.4 | 2.4 | 1.2 | 2.4 | 2.4 |
| | | Amount [parts by mass] | | 1.0 | 1.0 | 1.0 | 1.0 | 1.0 |
| | | Negative electrode active material (artificial graphite) [parts by mass] | | 98 | 98 | 98 | 98 | 98 |
| | | Viscosity modifier (CMC-Na) [parts by mass] | | 1 | 1 | 1 | 1 | 1 |
| Negative electrode mixed material layer | Mass per unit area [mg/cm²] | | | 14.0 | 14.0 | 14.0 | 14.0 | 14.0 |
| | Thickness [μm] | | | 77 | 85 | 77 | 77 | 77 |
| | Porosity [%] | | | 18.8 | 26.4 | 18.8 | 18.8 | 18.8 |
| | Bulk density [g/cm³] | | | 1.82 | 1.65 | 1.82 | 1.82 | 1.82 |
| Evaluation | Peel strength | | | B | A | A | A | A |
| | Battery rate characteristics | | | B | A | B | D | D |
| | Battery cycle characteristics | | | B | A | B | A | D |

| | | | | | | Comparative Example 3 | Comparative Example 4 | Comparative Example 5 |
|---|---|---|---|---|---|---|---|---|
| Slurry composition | Binder composition | First particulate polymer | Composition [mass %] | BA | | 96.0 | 96.0 | 96.0 |
| | | | | MAA | | 2.0 | 2.0 | 2.0 |
| | | | | AN | | 2.0 | 2.0 | 2.0 |
| | | | | NMA | | — | — | — |
| | | | | AMA | | — | — | — |
| | | | | AAmid | | — | — | — |
| | | Degree of swelling in electrolysis solution [mass %] | | | | 650 | 650 | 650 |
| | | Glass transition temperature [° C.] | | | | −40 | −40 | −40 |
| | | Number average particle diameter [nm] | | | | 350 | 350 | 350 |
| | | Amount [parts by mass] | | | | 0.8 | 0.8 | 0.8 |
| | | Second particulate polymer | Composition [mass %] | BD | | 23.2 | 51.2 | 23.2 |
| | | | | ST | | 60.0 | 44.0 | 60.0 |
| | | | | IA | | 3.8 | 3.8 | 3.8 |
| | | | | β-HEA | | 1.0 | 1.0 | 1.0 |
| | | | | AN | | 12.0 | — | 12.0 |
| | | Degree of swelling in electrolysis solution [mass %] | | | | 250 | 150 | 250 |
| | | Glass transition temperature [° C.] | | | | 34 | −20 | 34 |
| | | Number average particle diameter [nm] | | | | 145 | 145 | 145 |
| | | Amount [parts by mass] | | | | 0.2 | 0.2 | 0.2 |
| | | Proportion constituted by first particulate polymer [mass %] | | | | 80 | 80 | 80 |
| | | Particle diameter ratio *1 [—] | | | | 2.4 | 2.4 | 2.4 |
| | | Amount [parts by mass] | | | | 1.0 | 1.0 | 1.0 |
| | | Negative electrode active material (artificial graphite) [parts by mass] | | | | 98 | 98 | 98 |
| | | Viscosity modifier (CMC-Na) [parts by mass] | | | | 1 | 1 | 1 |
| Negative electrode mixed material layer | Mass per unit area [mg/cm²] | | | | | 14.0 | 14.0 | 14.0 |
| | Thickness [μm] | | | | | 77 | 77 | 85 |
| | Porosity [%] | | | | | 18.8 | 18.8 | 26.4 |
| | Bulk density [g/cm³] | | | | | 1.82 | 1.82 | 1.65 |
| Evaluation | Peel strength | | | | | D | D | D |
| | Battery rate characteristics | | | | | D | A | B |
| | Battery cycle characteristics | | | | | D | C | D |

*1 First particulate polymer/Second particulate polymer

Examples 1-15 in Table 1 demonstrate that an electrode having excellent peel strength and a secondary battery having excellent rate characteristics and cycle characteristics can be obtained through combined use of a first particulate polymer and a second particulate polymer having degrees of swelling in electrolysis solution and glass transition temperatures that are within specific ranges.

Moreover, Comparative Examples 1-5 in Table 1 demonstrate that, particularly in a situation in which the density of an electrode mixed material layer is increased, it is not possible to improve both electrode peel strength and secondary battery rate characteristics and cycle characteristics through combined use of a first particulate polymer and a second particulate polymer having degrees of swelling in electrolysis solution and glass transition temperatures that are outside of the specific ranges.

Furthermore, Examples 1-13 in Table 1 demonstrate that it is possible to achieve high levels of improvement of both electrode peel strength and secondary battery rate characteristics and cycle characteristics by adjusting the degrees of swelling in electrolysis solution, the glass transition temperatures, and the compositions of the first particulate polymer and the second particulate polymer.

Moreover, it can be seen from Table 1 that performance displayed in Example 1 was equivalent to that in Example 14 whereas rate characteristics in Comparative Example 3 were poorer than those in Comparative Example 5. These results demonstrate that, particularly in a situation in which the density of an electrode mixed material layer is increased, deformation of an electrode active material during a pressing process can be inhibited and lowering of secondary battery rate characteristics can be suppressed through combined use of a first particulate polymer and a second particulate polymer having degrees of swelling in electrolysis solution and glass transition temperatures that are within the specific ranges.

Furthermore, Examples 1 and 15 in Table 1 demonstrate that secondary battery rate characteristics and cycle characteristics can both be achieved to high levels by adjusting the number average particle diameters of the first particulate polymer and the second particulate polymer.

INDUSTRIAL APPLICABILITY

According to the present disclosure, it is possible to provide a binder composition for a secondary battery electrode that has excellent binding capacity and can cause a secondary battery to display excellent rate characteristics and cycle characteristics.

Moreover, according to the present disclosure, it is possible to provide a slurry composition for a secondary battery electrode capable of forming an electrode mixed material layer that has excellent binding capacity with a current collector and can cause a secondary battery to display excellent rate characteristics and cycle characteristics.

Furthermore, according to the present disclosure, it is possible to provide an electrode for a secondary battery that has high peel strength and can cause a secondary battery to display excellent rate characteristics and cycle characteristics.

Also, according to the present disclosure, it is possible to provide a secondary battery having excellent rate characteristics and cycle characteristics.

The invention claimed is:

1. A binder composition for a secondary battery electrode comprising:
    a first particulate polymer having a degree of swelling in electrolysis solution of at least 400 mass % and no greater than 900 mass % and a glass transition temperature of at least −60° C. and no higher than −15° C.;
    a second particulate polymer having a degree of swelling in electrolysis solution of greater than 100 mass % and no greater than 200 mass % and a glass transition temperature of at least −10° C. and no higher than 30° C.;
    water, wherein
    the first particulate polymer includes at least 50 mass % and no greater than 99.5 mass % of a (meth)acrylic acid ester monomer unit, and
    the degree of swelling in electrolysis solution is measured using an electrolysis solution obtained by dissolving $LiPF_6$ at a concentration of 1.0 M in a mixed solvent of ethylene carbonate and ethyl methyl carbonate having a weight ratio ethylene carbonate/ethyl methyl carbonate of 3/7 and 2 volume % of vinylene carbonate; and
    the degree of swelling in the electrolysis solution is calculated according to a following formula:

Degree of swelling (mass %)=($W1/W0$)×100 where W1 is a mass of a film piece that is formed by drying an aqueous dispersion containing a particulate polymer and immersed in an electrolysis solution (composition: $LiPF_6$ solution of 1.0 M in concentration (mixed solvent of 3/7 (weight ratio) ethylene carbonate/ethyl methyl carbonate used as solvent 2 volume % (solvent ratio) of vinylene carbonate added as additive)) for 72 hours at an ambient temperature of 60° C., and W0 is a mass of a film piece before immersion.

2. The binder composition for a secondary battery electrode of claim 1, wherein
    in terms of solid content, the first particulate polymer is contained in an amount of at least 30 parts by mass and no greater than 95 parts by mass per 100 parts by mass, in total, of the first particulate polymer and the second particulate polymer.

3. The binder composition for a secondary battery electrode of claim 1, wherein
    the second particulate polymer includes at least 5 mass % and no greater than 70 mass % of a conjugated diene monomer unit and at least 10 mass % and no greater than 90 mass % of an aromatic vinyl monomer unit.

4. The binder composition for a secondary battery electrode of claim 1, wherein
    a number average particle diameter of the first particulate polymer is equal to a number average particle diameter of the second particulate polymer multiplied by a factor of at least 1 and no greater than 5.

5. A slurry composition for a secondary battery electrode comprising:
    the binder composition for a secondary battery electrode of claim 1; and
    an electrode active material.

6. An electrode for a secondary battery comprising an electrode mixed material layer obtainable using the slurry composition for a secondary battery electrode of claim 5.

7. The electrode for a secondary battery of claim 6, wherein
    the electrode mixed material layer has a porosity of at least 10.7% and no greater than 24.1%.

8. A secondary battery comprising
    a positive electrode, a negative electrode, a separator, and an electrolysis solution, wherein
    either or both of the positive electrode and the negative electrode are the electrode for a secondary battery of claim 6.

* * * * *